United States Patent [19]  [11] 4,413,406
Bennett et al.  [45] Nov. 8, 1983

[54] PROCESSING AMORPHOUS METAL INTO PACKETS BY BONDING WITH LOW MELTING POINT MATERIAL

[75] Inventors: Moreland P. Bennett, Hickory; Donald E. Ballard, Conover, both of N.C.

[73] Assignee: General Electric Company, Philadelphia, Pa.

[21] Appl. No.: 245,402

[22] Filed: Mar. 19, 1981

[51] Int. Cl.³ .............................................. H01F 3/04
[52] U.S. Cl. ..................................... 29/609; 228/190; 228/249
[58] Field of Search ................... 29/609, 605; 228/190, 228/235, 203, 249, 261, 256; 336/213, 234, 177, 219; 310/217

[56] References Cited

U.S. PATENT DOCUMENTS 2,334,131 11/1943 Schultz ..................................... 242/4
2,479,325 8/1949 DeDomenico ....................... 310/217
3,043,000 7/1962 Hatfield .............................. 29/155.57
3,550,266 12/1970 Pickles et al. .......................... 29/609
4,155,397 5/1979 Honsinger et al. ................... 164/263
4,219,355 8/1980 DeCristofaro ...................... 75/123 B
4,288,773 9/1981 Alley et al. .......................... 336/160

OTHER PUBLICATIONS

F. E. Luborsky et al., "Strain-Induced Anisotropy in Amorphous Alloys and the Effect of Toroid Diameter on Magnetic Properties", published in IEEE Transactions on Magnetic, vol. MAG-15, No. 6, Nov., 1979.
"Metallic Glasses-A New Technology"; J. J. Gilman, published in 1977 by North-Holland Publishing Co.

Primary Examiner—Carl E. Hall
Assistant Examiner—P. W. Echols
Attorney, Agent, or Firm—William Freedman; John P. McMahon

[57] ABSTRACT

A method for forming cores for an electrical transformer is disclosed. Also disclosed are the cores made from such a method. In one embodiment an amorphous metal core has relatively thick superimposed laminations comprised of relatively thin amorphous metal sheets. The amorphous metal sheets are heated and bonded together by a metallic bonding agent to form relatively thick amorphous metal packets for the superimposed laminations of the core. The heating and bonding of the amorphous metal sheets reduce the mechanical stresses normally induced into the amorphous metal during the fabrication process. In another embodiment a hybrid core has superimposed laminations certain of which comprise sheets of non-crystalline amorphous metal and one or more sheets of crystalline silicon steel metal.

16 Claims, 6 Drawing Figures

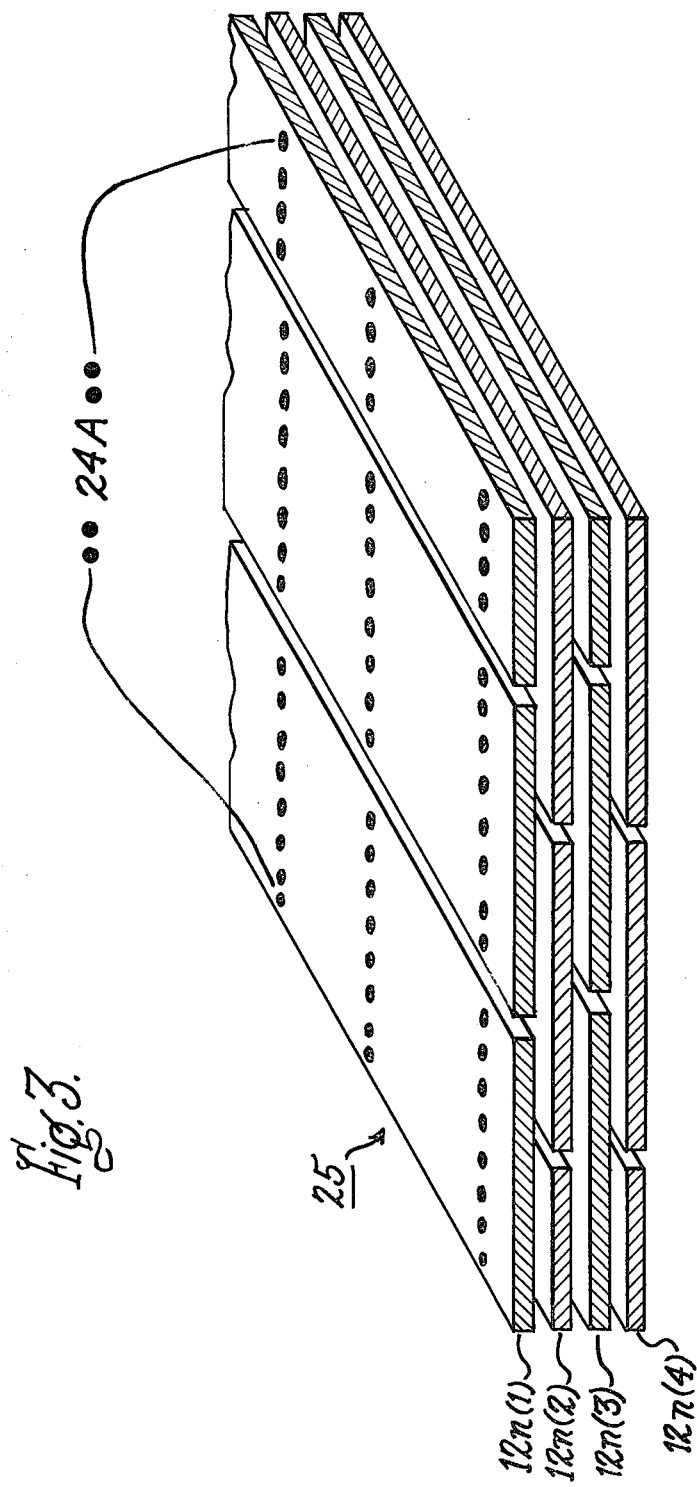

PROCESSING AMORPHOUS METAL INTO PACKETS BY BONDING WITH LOW MELTING POINT MATERIAL

BACKGROUND OF THE INVENTION

This invention relates to a method for making a core for an electrical transformer, and more particularly, a core formed from superimposed packets comprised of relatively thin sheets of an amorphous metal. The invention is also concerned with the core as an article of manufacture.

Amorphous metals having a non-crystalline structure are desired in forming elecromagnetic devices, such as cores for electrical transformers, because of their superior electrical characteristic relative to crystalline steel type metals. The amorphous metals are typically made available on rolls of a continuous relatively thin sheet having a relatively narrow width. The relatively thin sheets have the advantage of correspondingly forming relatively thin laminations of an amorphous metal core to reduce the eddy currents within the amorphous metal core, which, in turn, reduce the electrical losses of the core. However, the relatively thin sheets of amorphous metals have the disadvantages of (1) requiring more laminations to form a desired amorphous metal core, and (2) causing difficulty in handling during the manipulative steps involved in forming an amorphous metal core.

Furthermore, the magnetic properties of the amorphous metals have been found to be deleteriously affected by mechanical stresses such as those created by the fabricating steps of winding and forming the amorphous metals into a desired core shape. See, for example, a technical article entitled, "Strain-Induced Anisotropy in Amorphous Alloys and the Effect of Toroid Diameter on Magnetic Properties"; by F. E. Luborsky et al, published in the IEEE TRANSACTIONS ON MAGNETICS, VOL. MAG-15, No. 6, November 1979.

Accordingly, objects of the present invention are to provide a core formed of amorphous metal and a method of forming the amorphous metal core in which (1) the effective number of laminations of the amorphous metal core are reduced, (2) the difficulties of handling the amorphous metal to perform the manipulative steps of the fabrication process are reduced, and (3) the mechanical stresses induced into the amorphous metal core during its fabrication process are reduced. These and other objects of the present invention are accomplished, in part, by heating and bonding together a plurality of amorphous metal sheets to form packets that are used in fabricating the core.

It is a further object of the present invention to provide for such a bonding operation in which the amorphous metal is maintained within a desired temperature range such that it does not transform from its non-crystalline to a crystalline state.

These and other objects of the invention will become apparent to those skilled in the art upon consideration of the following description of the invention.

SUMMARY OF THE INVENTION

The present invention is directed to providing an amorphous metal core having relatively thick amorphous metal core laminations.

In accordance with one preferred embodiment of the present invention, a method of forming an amorphous metal core for an electromagnetic device having relatively thick superimposed amorphous metal laminations comprised of a plurality of superimposed relatively thin amorphous metal sheets is provided. The method comprises the steps of: (a) providing a plurality of amorphous metal sheets of extended length and positioning the sheets adjacent each other so that immediately-adjacent sheets have confronting surfaces; (b) applying to at least one confronting surface of each pair of immediately-adjacent sheets a deposit of metallic material having a melting temperature within the range of 50° to 350° C.; (c) bringing together the plurality of amorphous metal sheets into a composite sheet having a thickness corresponding to the approximate thickness of one of the laminations; (d) applying heat to the composite sheet so as to elevate its temperature to a value greater than the melting temperature of said deposit but less than the critical temperature of the amorphous metal sheets which would otherwise cause the amorphous metal to make a transition from its non-crystalline state to its crystalline state; (e) allowing sufficient cooling of said composite sheet to cause the deposit to solidify and bond together the sheets of the composite; (f) cutting the bonded composite sheet transversely of its length into packets of predetermined lengths corresponding to the desired lengths of the amorphous metal laminations and (g) arranging said packets into said superimposed laminations having a desired shape for said amorphous metal core.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

BRIEF DESCRIPTION OF THE DRAWINGS

FIG. 3 shows a typical arrangement of the laminations of the core of the present invention having amorphous metal layers staggered and bonded into a packet.

DETAILED DESCRIPTION OF THE PREFERRED EMBODIMENT

Figure 1:
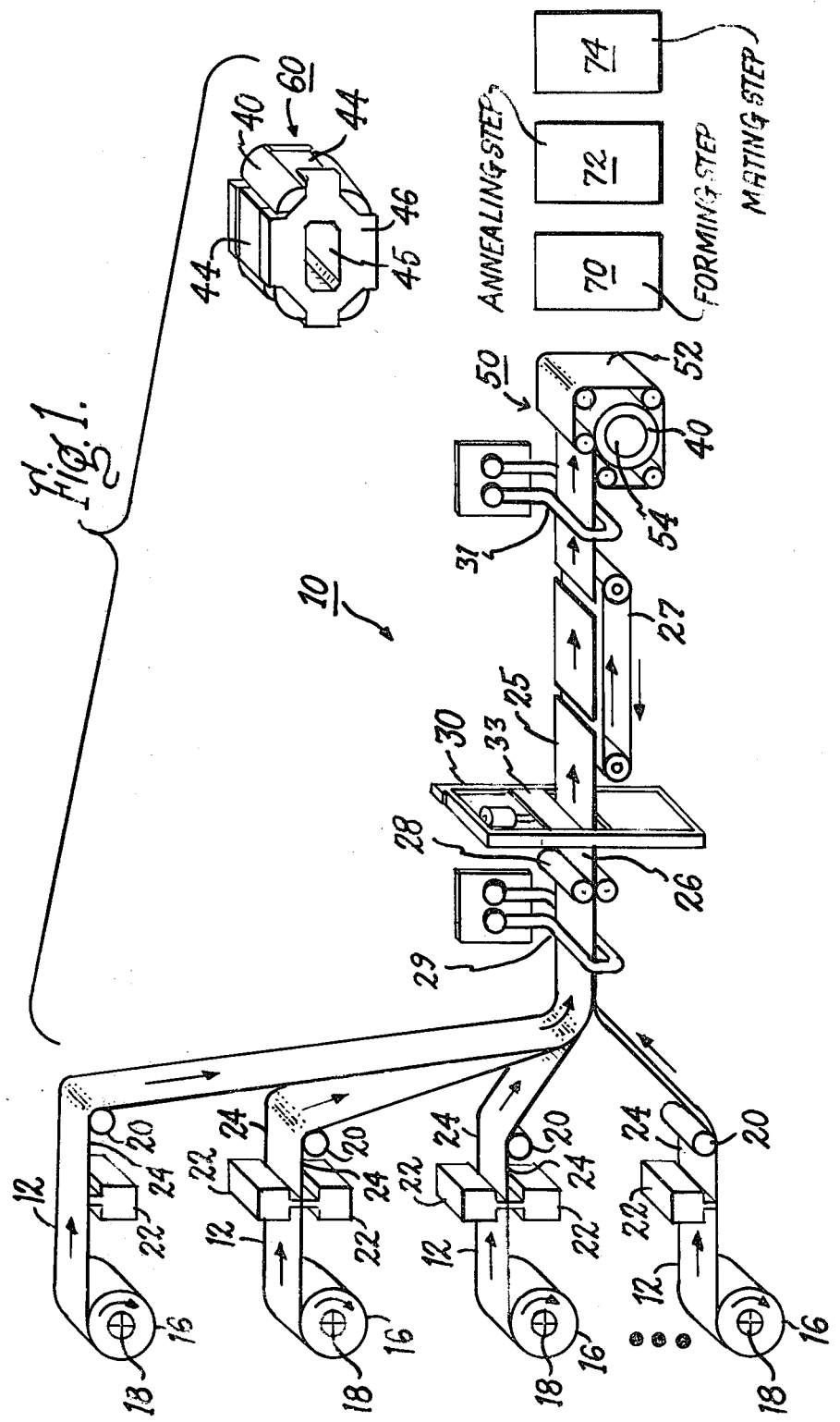
FIG. 1 is an overview of a method of the present invention.

FIG. 1 is an overview of a method of the present invention to form an electromagnetic amorphous metal core for an electrical transformer. The present invention is primarily related to forming a plurality of amorphous metal sheets 12 arranged on rolls 16 into an amorphous metal electromagnetic core 40.

The amorphous metal may be of the type METGLAS KMD 219 supplied by Allied Chemical Corporation. The amorphous metal is supplied as a continuous relatively thin sheet 12 in rolls 16 which have an inner surface that may be arranged onto a holding and tension roller 18. The present invention uses a plurality of amorphous metal sheets 12 separately positioned in a plurality of rolls 16. For the sake of clarity, the amorphous metal sheets 12, individually positioned in rolls 16, will hereinafter be referred to as the first, second, third, and fourth sheets 12 wherein the order of the amorphous metal sheets starts with the uppermost sheet shown in FIG. 1. However, it should be noted that the number of desired amorphous metal sheets 12 is determined by the desired dimensions of the amorphous metal core as will be described hereinafter.

The amorphous metal sheets 12, are shown in FIG. 1, as being moved in a longitudinal direction from the rolls 16 to a winding device 50. To accomplish such movement, the amorphous metal sheets 12 are first moved from the rolls 16 to a shearing means 30 primarily by diametrically positioned drive rollers 28 acting in cooperation with the holding and tension rollers 18 and a plurality of guide rollers 20. The holding and tension rollers 18 provide the tension means for controlling the speed at which the drive rollers 28 move or drag the amorphous metal sheets 12 off the rolls 16 so as to provide a smooth flow of amorphous metal sheets 12 from rolls 16 to shearing means 30. The guide rollers 20 guide or direct the amorphous metal sheets 12 from the rolls 16 to the shearing means 30 as shown in FIG. 1. As will be discussed, after the amorphous metal sheets 12 are cut by shearing means 30 a conveyor belt 27 in cooperation with the winding device 50 supply the drive means to continue the movement of amorphous metal sheets 12 as shown in FIG. 1.

A plurality of dispensing means 22 are positioned to supply a deposit 24 onto selected surfaces of the amorphous sheets 12 at a position downstream from rotating rolls 16. The dispensing means 22 are arranged, as shown in FIG. 1, to place a desired heated or non-heated deposit 24, to be described hereinafter, onto, (1) the bottom surface of the first sheet of amorphous metal, (2) the top and bottom surfaces of the second and the third sheet of amorphous metal, and (3) the top surface of the fourth sheet of amorphous metal. The placement of the deposit 24 onto the above-described surfaces of the amorphous sheet 12 is the preferred method although if desired the deposit 24 need only be placed on a single one of any two contacting surfaces of the amorphous metal sheets 12. Furthermore, as previously mentioned, the desired number of amorphous metal sheets 12 typically exceeds the four amorphous metal sheets 12 shown in FIG. 1. In such cases, the deposit 24 need only be applied to one of the contacting surfaces of each of the added amorphous sheets 12.

The plurality of rollers 20 are arranged, as shown in FIG. 1, to direct or focus the four shown amorphous metal sheets 12 having the applied deposit 24 toward the input of a heating means 29. Heating means 29 provides a heating source which elevates the temperature, to be described, of the four amorphous metal sheets 12 having the applied deposit 24 to a desired temperature. The amorphous metal sheets 12 heated by heating means 29 are routed to the diametrically positioned drive rollers 28 which exert pressure so as to compress or squeeze together the four amorphous sheets 12 each having the applied deposit 24. Heating means 29 elevating the temperature of the four amorphous metal sheets to the desired temperature primarily performs two functions: (1) it allows the dispensed deposit 24 to be bonded, after sufficient cooling time, to the amorphous metal sheets 12; and (2) it forms the amorphous metal sheets 12 into a composite amorphous metal sheet 26. The composite amorphous metal sheet 26 is shown in FIG. 1 at the output side of the drive rollers 28. Although heating means 29 is shown in FIG. 1 as comprising a substantially U-shaped heating device, it should be recognized that other suitable heating means, such as a hot plate, a heat lamp, a resistance or an inductive heating device may instead be utilized to elevate the temperature of the amorphous metal sheets 12 to a desired value.

After the composite amorphous metal sheet 26 has been formed by heating means 29 it is moved into a shearing means 30 having a heated blade 33. The heated blade feature is not part of the present invention and therefore will be described only generally in the present application. Shearing means 30, by driving the blade 33 through the composite amorphous metal sheet 26, shears, severs or cuts the composite sheet 26 into a plurality of packets 25 each having a predetermined length. The packets 25 are then moved by conveyor belt 27 into a preferred second heating means 31 which is interrelated with the winding device 50. Desired heating means 31 causes the individual amorphous metal sheets contained in packets 25 to become un-bonded so that the packets 25 of un-bonded sheets 12 may be properly wound into superimposed layers by the wrapping device 50 to form the desired laminations or turns for the amorphous metal core 40. If desired, the heating means 31 may be omitted if the temperature of the cut packets 25 that are to be fed into winding device 50 is such that the individual sheets are already un-bonded.

Wrapping device 50 receives un-bonded packets 25 of amorphous metal and tightly wraps or winds these packets 25 about mandrel 54. The tight wrapping of the un-bonded amorphous metal sheets 12 of a packet 25 acts to prevent voids or wrinkles between these sheets. As the temperature falls, the bonding agent solidifies to rebond the sheets, restoring the packet to a bonded condition; and the packets form the superimposed layers or laminations of the desired core 40.

In practice, the wrapping device 50 receives a first un-bonded packet 25 having a predetermined length which is the smallest of all the packets 25 for core 40. The first packet 25 is wound around mandrel 54 by wrapping device 50 to form the innermost lamination for amorphous metal core 40. The subsequently received packets 25 have progressively increasing lamination lengths, relative to the first packet 25, so that wrapping device 50 sequentially wraps each received packet 25 about the innermost lamination in a radially increasing manner.

Wrapping device 50 may be a core winding machine available from Tranco Co., Toronto, Ontario Province, Canada as their Model #SD1036. Wrapping device 50 wraps the packets 25 about a mandrel 54 to form the inner surface for the amorphous metal core 40. FIG. 1 shows mandrel 54 as having a shape of circular cross-section; however, mandrel 54 may be supplied to have other shapes such as one of a rectangular cross-section.

Upon completion of the wrapping of the amorphous metal core 40, the core 40 is formed into its desired final shape. To accomplish such forming a strapping band is first placed about the outer periphery of core 40. The core is then placed onto a fixture which supplies forces, typically horizontal forces, the change to form of core 40 from the shape of the mandrel 54 to the desired final shape. Clamping fixtures, such as 44 and 46 are then placed onto core 40 so as to maintain the desired final shape during further fabrication steps. The desired final shape of core 40 is shown most clearly in FIG. 1 as designated by reference number 60 showing the rectangularly shaped outer periphery of amorphous metal core 40 having a central window 45 of generally rectangular shape and clamping fixtures 44 and 46 attached. During the forming step the amorphous metal packets 25 constituting the core 40 are still warm from the heating operation at heating means 31. The elevated temperature of the packets at this time has the effect of reducing the mechanical stress that would otherwise typically be induced into an un-warmed amorphous metal by the forming step. The warmed packets 25 are more easily deformed by the forming forces into the desired configuration. The forming step is indicated in the sequence of FIG. 1 by a rectangular box 70.

Upon the completion of the forming step 70, the core 40 is next positioned in an annealing oven to perform an annealing process on core 40. The annealing step is shown in the sequence of FIG. 1 as a rectangular box 72. The annealing step 72 subjects the amorphous core 40 to a relatively high temperature in an inert gas and also subjects it to a relatively high magnetic field that is present in the oven. The annealing temperature is in the order of 360° C. and the inert gas in the annealing oven may be of the nitrogen type. The relatively high magnetic force is in the order or 10 Oersted. Subjecting the cores to a high temperature in an inert gas and magnetic field is well known and is described in U.S. Pat. No. 4,219,355. The annealing step partially relieves the deleterious mechanical stress primarily induced in the amorphous material during the prior wrapping and forming operations. The annealing temperature also causes re-melting of the bond between the sheets of the respective laminations, allowing these sheets to move slightly and to more closely conform to the shape of the formed core, both of which contribute to stress-relief.

Upon completion of the annealing step 72 the fixtures 44 and 46 are removed from amorphous metal core 40 and the fabrication process of the amorphous metal core 40 is complete. The finished amorphous metal core 40 may then be mated with its appropriate electrical coil (not shown). Conventional techniques may be used for mating the core with the coil, such as winding a coil about a portion of the core. See, for example, U.S. Pat. Nos. 2,334,131—Schultz and 3,043,000—Hatfield. The mating step is shown in the sequence of FIG. 1 as a rectangular box 74.

As previously mentioned, the bonding operation performed by heating means 29 elevated the temperature of the amorphous metal sheets 12 to a desired level. Also, the amorphous metal sheets 12 bonded by heating means 29 have the desired deposit 24 placed onto their selected surface or surfaces. The desired deposit 24 is selected from a group of metals or alloys that have a melting temperature within the range of 50° C. to 350°. Metals such as these may be indium, bismuth, lead, cadmium, tin or alloys of these selected metals. The desired deposit may be heated or unheated. For the arrangement shown in FIG. 1, dispensing means 22 applied a heated deposit 24 to unheated amorphous metal sheets 12. However, the deposit 24 may also be applied in an unheated state if the amorphous metal sheets 12 are heated. Similarly, the deposit 24 may be applied in a heated state if the amorphous metal sheets 12 are heated.

The maximum melting temperature of 350° C. for these selected materials is less than a critical transformation temperature related to the amorphous metal having a typical value of 450° C. The critical typical temperature of 450° C. is the temperature which when reached or exceeded transforms the amorphous metal from its non-crystalline state to its crystalline state. If the amorphous metal is transformed to its crystalline state, its superior electrical qualities that provide for reduced electrical losses for the amorphous metal core 40 are substantially reduced.

The metallic deposit 24 provides an agent which when heated by heating means 29 to its desired temperature range of 50° to 350° C. and then cooled to its solid state bonds together the amorphous metal sheets 12. Various distribution patterns of the metallic deposit 24 applied to amorphous metal sheets 12 are shown on FIGS. 2A, 2B, 2C and 2D.

Figure 2A:
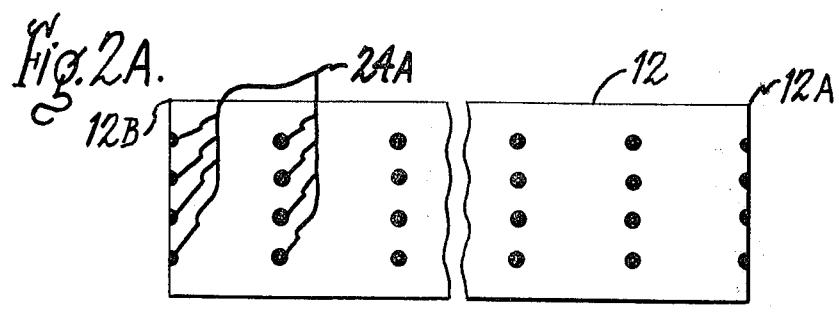
FIGS. 2A, 2B, 2C, and 2D show alternate embodiments of the deposit patterns of the present invention.

FIG. 2A shows a portion of an amorphous metal sheet 12 having a plurality of metallic deposit droplets applied in a transverse manner across the major portion of sheet 12 and arranged in a distribution pattern $24_A$. The amount of the metallic deposit 24 comprised in the distribution pattern $24_A$ is dependent upon the dimensions of the amorphous metal sheet 12. For amorphous metal sheet 12 having the previously given dimension of a thickness of 0.038 mm (1.5 mils) and a width of 25.4 mm (1.0 in), the total amount of the four droplets spread across the amorphous sheet 12, as shown in FIG. 2A, is typically 0.0004096 cu cm (0.000025 cu in). The typical longitudinal spacing between the distribution patterns $24_A$ is 2.54 cm (1.0 in).

Figure 2B:
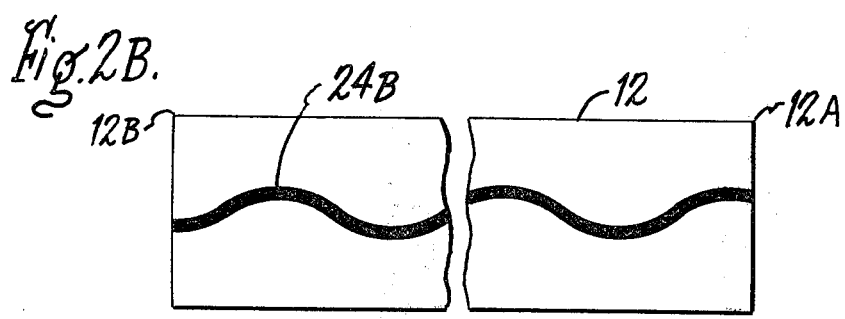
Figure 2C:
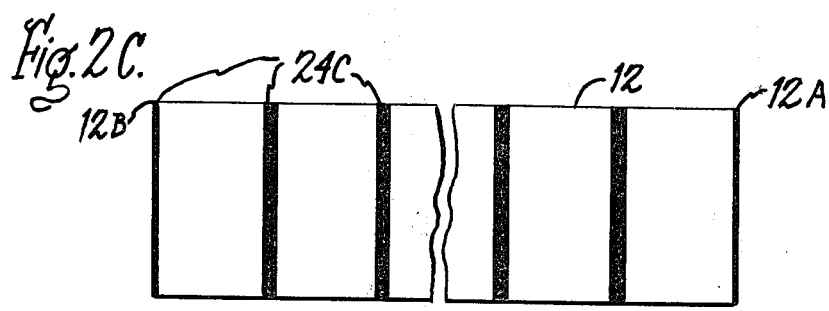
Figure 2D:
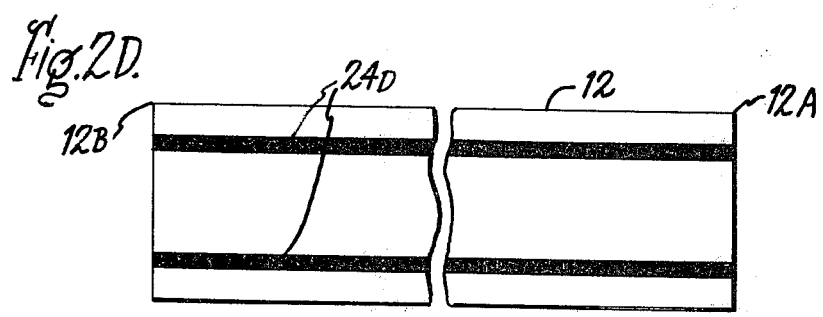

FIG. 2A, and also FIGS. 2B, 2C, and 2D, show the deposit 24 in various distribution patterns such as $24_A$ at being positioned on portions 12A and 12B, of the amorphous sheet 12. The portion 12A represents the leading edge or first portion of sheet 12 that is severed by shearing means 30 in the formation of an individual packet 25. Conversely, the portion 12B represents the lagging or terminal portion of sheet 12 that is severed by shearing means 30 in the formation of an individual packet 25. The deposit 24 is preferably placed on the leading 12A and lagging 12B portions of the plurality of amorphous sheets 12 comprising the composite sheet 26 so as to provide a bonded arrangement of sheets 12 as the sheets 12 are severed by shearing means 30. If desired, the deposit 24 need not be applied to the lagging portion 12B. The severing of the amorphous sheets 12 by shearing means 30 occurs at this location so as to allow a portion of deposit 24 to remain on each of the sheets that are separated. This is best illustrated in FIG. 2A which shows a semi-circular shape of droplets of the distribution pattern located at the leading and lagging portions, 12A and 12B, respectively. The semi-circular shape is meant to represent that the droplets of distribution pattern 24A having an original full-circular shape or cut-in half by shearing means 30 at portions 12A and 12B.

FIG. 2B shows a second alternate distribution pattern $24_B$ of the applied metallic deposit 24 having a sinusoidal representation located at the central portion of a portion of an amorphous metal sheet 12. The amount of metallic deposit 24 applied to one (1) linear centimeter (2.54 in) of the amorphous metal sheet 12 having the previously given dimension is typically 0.0007538 cu cm (0.000046 cu in ). The sinusoidal pattern $24_B$ may have typically dimensions wherein a 360 degree variation of the pattern $24_B$ has a longitudinal span of 5.08 cm (2.0 in) with the separation of the peaks and valleys of the curve being 2.032 cm (0.8 in).

FIG. 2C shows a third alternate distribution pattern $24_C$ of the applied metallic deposit 24 substantially applied across the full width of an amorphous metal sheet 12. The typical spacing between the patterns $24_C$ is 2.54 cm (1.0 in) and the typical amount of metallic deposit 24 spread across the amorphous metal sheet 12 is 0.0007538 cu cm (0.000046 cu in).

A fourth alternate distribution pattern $24_D$ of the applied metallic deposit 24 is shown in FIG. 2D. The pattern 24D comprises a first and second strip of metallic deposit 24 horizontally applied at opposite edge portions of the amorphous metal sheet 12. The two strips are typically spaced apart by 2.032 cm (0.8 in) and each strip has an amount of 0.0009832 cu cm (0.00006 cu in) applied to one (1) linear centimeter (2.54 inches) of the representative amorphous metal sheet 12.

In one typical operation of the present invention, the effect of the bonding of the metallic deposit 24, arranged in one of the various distribution patterns $24_A$, $24_B$, $24_C$ or $24_D$, transforms seven relatively thin amorphous sheets 12, each sheet in the order of 0.038 mm (1.5 mils) thickness of amorphous metal into a relatively thick packet 25 having a thickness in the order of 0.29 mm (11.5 mils). The heating associated with bonding also softens the amorphous metal sheet 12 arranged within the packet 25 before the packet 25 is cut by shearing means 30.

The formation of a relatively thick amorphous metal packet 25 accomplishes two results: (1) it reduces the effective number of laminations required to form the desired amorphous metal core 40, and (2) it reduces the difficulties of handling of the amorphous metal involved with manipulative steps to form the desired amorphous metal core 40. The number of required laminations for core 40 is reduced by a factor related to the relative thickness between the individual amorphous metal sheets 12 and the amorphous metal packet 25. For the dimension previously given for amorphous metal sheets 12 and packet 25 this factor is approximately 7.66. The reduction in the difficulties in handling the amorphous metal is realized when the relatively thin amorphous metal sheets 12, having physical properties of brittleness and thinness each contributing to difficulty in handling, is transformed into a heated relatively thick packet 25. The heating reduces the brittleness state of the packet 25 and the bonding of the sheets increases its thickness, both contributing to reducing the difficulties of handling. The difficulties of handling are also reduced by heating packet 25 because the heating reduces the ragged or sharp edges that would normally occur if the unheated amorphous metal sheets 12 were cut by shearing means 30. Heating the packet 25 before the cutting by shearing means 30 renders the amorphous metal more amenable to cutting and results in relatively smooth edges of the cut packet 25. Certain aspects of such heating and cutting are disculsoed and claimed in an Application by one of the present applicants, M. P. Bennett, S.N. 313,047, filed October 19, 1981. The general idea of heating a stack of amorphous metal sheets and using a heated blade for cutting such heated stack is disclosed in such application and may be treated as prior art wih respect to the present application. The presence of smooth edges, instead of ragged ones, reduces the chances that manufacturing personnel will be cut by the amorphous metal packet 25 during its physical handling and also contributes to a closer fit between the ends of the packets when they are formed into the core.

The number of amorphous metal sheets 12 required to form a desired amorphous metal core 40 may be reduced by effectively increasing the width of packet 25 wound to form the desired amorphous metal core 40. For example, if the width of the packets 25 is increased by a factor of four (4) then the width of each lamination of the amorphous metal core is correspondingly increased by a factor of four (4). Increasing the width of the packets 25 is accomplished by increasing the combined width of the amorphous metal sheets 12 fed into heating means 29. For example, if it is desired to increase the width of packets 25 by a factor of four (4), the four individual rolls 16 of amorphous metal sheets 12, shown in FIG. 1, may be respectively replaced by four groups of rolls 16 of amorphous sheets 12 wherein each of the four groups comprises four individual rolls 16. The replacement of one individual roll 16, supplying a typical amorphous metal sheet 12 having a typical width of 2.54 cm (1.0 in), with four rolls 16 each supplying a typical width of 2.54 cm (1.0 in) for a total width of 10.16 cm (4.0 in), increases the width of the formed packet 25 by a factor of four (4). To accommodate the replacement of the one individual supply roll 16 with four individual supply rolls 16 the arrangement shown and described for FIG. 1 must be altered. The alteration of FIG. 1 is at a position upstream from the feed of the amorphous sheet 12 into the dispensing means 22. Appropriate guiding means are desired to direct or focus the amorphous metal sheets 12 from four separate supply rolls 16 into one path input so as to obtain the desired width input feed of 10.16 cm (4.0 in) into each of the positioned dispensing means 22 shown in FIG. 1. Accordingly, the plurality of rollers 20 and drive rollers 28 must also be altered to now accommodate a 10.16 cm (4.0 in) strip of amorphous metal sheets 12 instead of the previously described 2.5 cm (1.0 in) strip of amorphous metal sheets 12. These two mentioned accommodations provide an input to the heating means 29 with desirable 10.16 cm (4.0) wide amorphous sheets 12. Heating means 29 accepts the 10.16 cm (4.0 in) amorphous metal sheets 12, elevates their temperature and that of the bonding agent to the desired level, so as to bond the amorphous metal sheets 12 together, upon cooling, after leaving the heating means 29. This bond is developed both in a horizontal and vertical dimension, to form the desired wider and still-heated composite amorphous metal sheet 26, which is then cut into packets 25.

A portion of an amorphous metal packet 25 that may be formed in accordance with the practice of this invention is shown in FIG. 3. FIG. 3 shows four layers $12n$ (1), $12n$ (2), $12n$ (3) and $12n$ (4) of the bottom-most portion of a typical packet 25. The layer $12n$ (1) is shown as having the typical previously discussed deposit pattern $24_A$ on its surface. From FIG. 3 it should be noted that the four layers $12n$ (1), $12n$ (2), $12n$ (3) and $12n$ (4) may each be comprised of a plurality of amorphous metal sheets of different widths. Also from FIG. 3 it should be noted, the amorphous sheets of layers $12n$ (1), $12n$ (2), $12n$ (3) and $12n$ (4) may each have a staggered arrangement relative to each other. To obtain the staggered arrangement or any other desired arrangement between layers $12n$ (1) . . . $12n$ (4), the feed of the amorphous metal sheets 12 into the input of heating means 29 may be arranged in a manner similar to that previously discussed with regard to obtaining a wider amorphous metal sheet having the 10.16 cm (4.0 in) width. For example, to obtain a staggered arrangement between the layer $12n$ (1) and $12n$ (2) as shown in FIG. 3, the feed for layer $12n$ (1) would comprise two wide and one narrow amorphous sheets 12 respectively set side-by-side, and the feed for layer $12n$ (2) would comprise one narrow and two wide amorphous sheets 12 respectively set side-by-side.

The superimposed amorphous metal layers $12n$ (1) . . . $12n$ (4) shown in FIG. 3 constitute only one embodiment of an arrangement of a portion of packet 25 of the present invention. Various desired arrangements of packet 25 may be obtained from the practice of this invention. For example, the superimposed amorphous metal layers $12n$ (1) ... $12n$ (4) may all have the same width dimensions. Conversely, the layers $12n$ (1) ... $12n$ (4) may all have different amorphous metal widths as long as the total width of each layer $12n$ (1) ... $12n$ (4) is the same. Furthermore, the deposit pattern $24_A$ may be replaced by any of the previously discussed deposit patterns $24_B$, $24_C$ or $24_D$. Still further, any of the layers $12n$ (1) ... $12n$ (4) need not be an amorphous metal. For example, any number of the layers $12n$ (1) ... $12n$ (4) may be a crystalline silicon steel type metal so as to form a hybrid type core 40 having a combination of amorphous metal sheets 12 and crystalline silicon sheet type metal for its laminations. Although the broad idea of combining amorphous metal sheets 12 and crystalline silicon sheets is not part of this invention, the use of these types of metals in our claimed method and in our claimed core is considered to be a feature of the invention. For a hybrid core 40 the heating and bonding operations of this invention would result in packets 25 having superimposed layers of the amorphous metal and of the crystalline silicon metal.

The heating and bonding operations of this invention are of particular importance to the superimposed amorphous metal laminations of core 40. The heating and bonding operations reduce the mechanical stresses normally induced into the amorphous metal by conventional fabrication processes. These mechanical stresses have a deleterious effect on the magnetic properties of the amorphous metal, which, in turn, reduces its superior electrical characteristic relative to crystalline silicon steel type metals of corresponding dimensions. See, for example, the previously mentioned technical article by F. E. Luborsky et al, discussing the deterioration of the magnetic properties of amorphous alloy resulting from winding tensions.

The mechanical stresses may be induced in amorphous metals by a striking action of the shearing means 30, by the bending and compressing action of the winding device 50, and the mechanical pressures subjected to the wound core 40 during the forming step of the fabrication process. The heating and bonding operation of this invention provide an amorphous metal unit in the form of packet 25 which is adapted to reduce these induced mechanical stresses. Heating packet 25 reduces the striking or cutting force needed to sever the packet by shearing means 30, and also renders the packet more pliable and therefore more easily bent and compressed by winding device 50 to form the desired lamination of the amorphous metal core 40. Furthermore, heating packet 25 allows the sheets 12 and the packets 25 to move and to more easily conform to the shape of the desired core during the forming and annealing steps of the fabrication process. It has been empirically determined that by heating the packet 25 to its desired temperature range of 50° to 350° C., the mechanical stresses induced in the amorphous core 40 have been reduced and the electrical loss is correspondingly reduced.

It should be recognized that although amorphous metal core 40 was described as being a wound-type core, the heating and bonding operation of this invention is also applicable to stacked-type cores in which packet 25 formed from a plurality of superimposed amorphous metal sheets 12 or a combination of a superimposed amorphous metal sheets 12 and crystalline steel metal sheets may be accordingly arranged. It should be noted that the description previously given for unbonding the amorphous metal sheets 12 of packet 25 to allow sheets 12 to be wound by winding device 50 without wrinkles is not applicable to forming the packets 25 into a stacked-type core.

It should now be appreciated that this invention provides various type cores formed from an amorphous metal or a combination of amorphous metals and crystalline silicon metals. These cores have an improved electrical characteristic resulting from the superior electrical characteristics of the non-crystalline amorphous metal. Furthermore, this invention provides a method for forming the various amorphous metal related cores in which the number of required laminations are effectively reduced by the use of the thick packets 25 relative to the thin amorphous metal sheets 12. Still further, the method of this invention reduces the handling difficulties normally incurred with the relatively thin and brittle amorphous metal sheets 12 by providing a relatively thick packet 25 having smooth cut edges.

While we have shown and described particular embodiments of our invention, it will be obvious to those skilled in the art that various changes and modifications may be made without departing from out invention in its broader aspects; and we, therefore, intend herein to cover all such changes and modifications as fall within the true spirit and scope of our invention.

What we claim is:

1. A method of forming an amorphous metal core for an electromagnetic device having relatively thick superimposed amorphous metal laminations comprised of a plurality of superimposed relatively thin amorphous metal sheets, said method comprising the steps of:
   (a) providing a plurality of amorphous metal sheets of extended length and positioning said sheets adjacent each other so that immediately-adjacent sheets have confronting surfaces;
   (b) applying to at least one confronting surface of each pair of immediately-adjacent sheets a deposit of metallic material having a melting temperature within the range of 50° to 350° C.;
   (c) bringing together said plurality of amorphous metal sheets into a composite sheet having a thickness corresponding to the approximate thickness of one of said laminations;
   (d) applying heat to said composite sheet so as to elevate its temperature to a value greater than the melting temperature of said deposit but less than the critical temperature of the amorphous metal sheets which would otherwise cause the amorphous metal to make a transition from its non-crystalline state to its crystalline state;
   (e) allowing sufficient cooling of said composite sheet to cause the deposit to solidify and bond together the sheets of said composite sheet;
   (f) cutting said composite sheet transversely of its length into packets of predetermined lengths corresponding to the desired lengths of said amorphous metal laminations, and;
   (g) arranging said packets into said superimposed laminations having a desired shape for said amorphous metal core.

2. The method of claim 1 in which said composite sheet is subjected to a compressive force to cause spreading of said deposit of metallic material thereby facilitating bonding together the sheets of said composite sheet.

3. The method of claim 1 in which cutting of said composite sheet is effected while said composite sheet is at an elevated temperature.

4. A method according to claim 1 wherein said packets are arranged into said superimposed laminations by positioning the packets to form a stacked type core.

5. A method according to claim 4 wherein said sheets are arranged into a staggered configuration when brought together to form said composite sheet so that the sheets in said packets are staggered.

6. A method according to claim 1 wherein said packets are arranged into said superimposed laminations by wrapping the packets about a mandrel to form a wound-type core.

7. A method according to claim 6 wherein the amorphous metal sheets forming each packet are subjected to a heating operation that unbonds the sheets from each other prior to wrapping the packets about said mandrel.

8. A method according to claim 7 wherein the amorphous metal sheets forming each packet are arranged into a staggered configuration when brought together to form said composite sheet so that the sheets in said packets are staggered.

9. A method according to claim 7 wherein the packets that are wrapped about said mandrel are subjected to forces so as to change the shape of the packets from the form of the mandrel to a form desired for the final shape of the superimposed laminations of the core.

10. A method according to claim 8 wherein the packets that are wrapped about said mandrel having sheets arranged in a staggered configuration are subjected to forces so as to change the shape of the packets from the form of the mandrel to a form desired for the final shape of the superimposed laminations of the core.

11. A method according to claim 9 wherein the superimposed laminations are further subjected to an annealing step so as to reduce the stresses in the sheets contained in the core.

12. A method according to claim 10 wherein the superimposed laminations are further subjected to an annealing step so as to reduce the stresses in the sheets contained in the core.

13. A method according to claim 6 wherein the superimposed laminations are further subjected to an annealing step so as to reduce the stresses in the sheets contained in the core.

14. A method according to claim 4 wherein the superimposed laminations are further subjected to an annealing step so as to reduce the stresses in the sheets contained in the core.

15. A method according to claim 5 wherein the superimposed laminations are further subjected to an annealing step to reduce the stresses in the sheet contained in the core.

16. The method of any one of claims 1 through 8 in which:
(a) at least one sheet of crystalline steel is included within said composite sheet in a position immediately-adjacent one or more amorphous metal sheets and is bonded to said immediately-adjacent amorphous metal sheet or sheets, and
(b) the crystalline sheet is cut by the cutting step of (f) of claim 1 so that the packets include a section of said crystalline sheet.

* * * * *